United States Patent
Okada

(10) Patent No.: US 7,338,680 B2
(45) Date of Patent: Mar. 4, 2008

(54) MANUFACTURING METHOD OF PROCESSED FOOD CONTAINING KONNYAKU MATERIAL, AND THE PROCESSED FOOD MANUFACTURED WITH THIS MANUFACTURING METHOD

(75) Inventor: Tetsuko Okada, Tokiwa-mura (JP)

(73) Assignee: STC System Japan Co., Ltd. (JP)

( * ) Notice: Subject to any disclaimer, the term of this patent is extended or adjusted under 35 U.S.C. 154(b) by 481 days.

(21) Appl. No.: 10/653,544

(22) Filed: Sep. 2, 2003

(65) Prior Publication Data

US 2004/0213887 A1 Oct. 28, 2004

(30) Foreign Application Priority Data

Sep. 3, 2002 (JP) ............................. 2002-257232

(51) Int. Cl.
*A23L 1/32* (2006.01)
(52) U.S. Cl. ....................................... 426/614; 426/656
(58) Field of Classification Search ................ 426/614, 426/656
See application file for complete search history.

(56) References Cited

U.S. PATENT DOCUMENTS

| 5,358,731 | A | * | 10/1994 | Sakamoto et al. | .......... 426/574 |
| 5,587,197 | A | * | 12/1996 | Maeda et al. | ................ 426/658 |
| 6,180,148 | B1 | * | 1/2001 | Yajima | ........................ 426/392 |

FOREIGN PATENT DOCUMENTS

| JP | 56-137865 | * | 10/1981 |
| JP | 58-146260 | * | 8/1983 |
| JP | 62-019064 | * | 1/1987 |
| JP | 10215256 | * | 8/1989 |
| JP | 02-273146 | * | 11/1990 |
| JP | 07-231765 | * | 9/1995 |
| JP | 09-009888 | * | 1/1997 |
| JP | 10-052233 | | 2/1998 |

OTHER PUBLICATIONS

Japanese Cuisine website—"Oden". Published Jan. 1998. http://www.webarchive.org/web/19980125074959/http://www.bento.com/re_oden.html.*
Macrobiotic Diet. Author: Kushi. 1993. p. 196.*
The Book of Tofu. Authors: Shurtleff. 1998. p. 78.*
AllRecipes. Website: http://allrecipes.com/HowTo/okara/Detail.aspx. for The Food Lover's Companion, 2nd edition. Author: Herbst. 1995.*

* cited by examiner

*Primary Examiner*—Anthony Weier
(74) *Attorney, Agent, or Firm*—Steven J. Hultquist; Intellectual Property/Technology Law

(57) ABSTRACT

It is an object of the present invention to provide a method for manufacturing processed food that has no a specific smell and flavor of konnyaku, easily absorbs flavors, has good texture, feels good on the tongue, and does not fall apart when cooked. The present invention achieves the above-described object by providing a method for manufacturing processed food having the steps of: obtaining a mixture by mixing an egg, konnyaku material, and at least one material selected from a group of soy pulp, mushrooms, vegetables and fruits; and solidifying the mixture using an alkali solution.

7 Claims, No Drawings

MANUFACTURING METHOD OF PROCESSED FOOD CONTAINING KONNYAKU MATERIAL, AND THE PROCESSED FOOD MANUFACTURED WITH THIS MANUFACTURING METHOD

BACKGROUND

The present invention relates to a method for manufacturing processed food, comprising the steps of: mixing foodstuffs such as soy pulp (okara) and eggs, with konnyaku material; and solidifying this mixture using an alkali solution. This invention also relates to a processed food which has a desirable texture and which can be obtained by the above-described method.

Konnyaku is a plant, whose academic name is Amorphophalus Konjac K. Koch. A subterranean corm called konnyaku potato has been used for food since ancient times. The konnyaku potato contains nitric acid and cannot be eaten raw. Therefore, the konnyaku potato is made into a food product, for example, by simmering it, then grating it, and finally mixing the grated potato with an alkaline component to cause the mixture to solidify. The konnyaku potato solidifies because it contains glucomannan as a component. It is well known that when glucomannan absorbs water, it expands and becomes a sol, and when alkaline is further added to the sol and the mixture is heated, the mixture solidifies.

Moreover, it is also possible to cause solidification by grinding dried konnyaku potato; removing the impurities to obtain konnyaku powder (refined flour) that is made only of glucomannan; adding water to such konnyaku powder and; then using an alkaline coagulant.

Conventionally, a processed food manufactured by mixing soy pulp or bean pulp with konnyaku material and solidifying the mixture has been suggested (see Japanese Patent Laid-Open (Kokai) Publication HEI10(1998)-52233). However, even if a block of meat substitute can be made by changing the mixing ratio, the resultant product has a specific smell and flavor of konnyaku. It hardly absorbs flavors when simmered or fried, and has a dry texture like fish meat without the fat. It cannot keep a uniform flavor and texture because it is made of soy pulp. Therefore, there is a problem that it is difficult to enjoy eating it with simple seasoning.

Moreover, it does not have a good texture, nor it does not feel good on the tongue. It easily falls apart, and therefore, it is not suitable as processed food for daily dishes.

However, processed food containing konnyaku material includes low-calorie and good-quality food fiber, making it effective for health or beauty and is especially, highly effective for dieting. Therefore, the development of such processed food is desired.

SUMMARY

Accordingly, it is an object of the present invention to provide a method for manufacturing processed food containing konnyaku material, which has no a specific smell and flavor of konnyaku, easily absorbs flavors when simmered, has a good texture, feels good on the tongue, does not easily fall apart when cooked, and is delicious.

The inventor focused on the fact that soy pulp is rough-textured and highly absorbent, and found out that if soy pulp is caused to absorb, for example, eggs and is coated with konnyaku to be supplied as a food material, it becomes a food product having a meat-like texture.

According to the above-described findings, the present invention provides a method for manufacturing processed food comprising the steps of: obtaining a mixture by mixing an egg, konnyaku material, and at least one material selected from a group consisting of soy pulp, mushrooms, vegetables, and fruits; and solidifying the mixture using an alkali solution.

The present invention provides a method for manufacturing processed food comprising the steps of: obtaining a mixture by mixing a raw egg, konnyaku powder, and at least one material selected from a group consisting of dried soy pulp, dried mushrooms, dried vegetables, and dried fruits; and solidifying the mixture using an alkali solution.

According to a preferred embodiment of the manufacturing method of the present invention, at least one material selected from the group consisting of dried soy pulp, dried mushrooms, dried vegetables, and dried fruits is mixed with the konnyaku powder in a weight ratio ranging from 33:67 to 83:17.

According to a preferred embodiment of the manufacturing method of this invention, the raw egg is mixed with the konnyaku powder in a weight ratio ranging from 55:45 to 83:17.

This invention provides a method for manufacturing processed food comprising the steps of: obtaining a mixture by mixing a Chinese yam, konnyaku material, and at least one material selected from a group consisting of soy pulp, mushrooms, vegetables, and fruits; and solidifying the mixture using an alkali solution.

However, this invention provides a method for manufacturing processed food comprising the steps of: obtaining a mixture by mixing a Chinese yam, konnyaku powder, and at least one material selected from a group consisting of dried soy pulp, dried mushrooms, dried vegetables, and dried fruits; and solidifying the mixture using an alkali solution.

According to a preferred embodiment of the manufacturing method of this invention, at least one material selected from the group consisting of dried soy pulp, dried mushrooms, dried vegetables, and dried fruits is mixed with the konnyaku powder in a weight ratio ranging from 33:67 to 83:17.

According to a preferable embodiment of the manufacturing method of the present invention, the Chinese yam is mixed with the konnyaku powder in a weight ratio ranging from 72:28 to 83:17.

The present invention provides processed food manufactured by any one of the above-described manufacturing methods.

DETAILED DESCRIPTION

The details of the present invention are explained below according to its preferred embodiments.

The method for manufacturing processed food according to one preferred embodiment of the present invention comprises the steps of: obtaining a mixture by mixing an egg, konnyaku material, and at least one material selected from a group consisting of soy pulp, mushrooms, vegetables, and fruits; and solidifying the mixture using an alkali solution.

"Soy pulp" used in the present invention is the pulp left after squeezing soybean milk or soybean oil from soybeans, and the soy pulp is rough-textured and highly absorbent. It contains a plant protein and a small amount of fat, and has some flavor. Soy pulp is often dumped, and is thereby available at a low price.

In the manufacturing method of the present invention, a pulp left after squeezing mushrooms, vegetables, or fruits can also be used. Crushed or ground beans or grains may also be used, and both of them are rough-textured and highly absorbent. In this specification, the beans include processed foods such as frozen tofu or fried tofu.

If mushrooms are used, they are more fibered and firmer than soy pulp, which makes it possible to obtain the resultant product with a texture more like meat. Examples include mushrooms, shiitake (*Lentinus edodes*), matsutake (*Tricholoma matsutake*), shimeji (*Pleurotus ostreatus*), nameko (*Pholiota nameko*), enokidake (*Flammulina velutipes*), and maitake (*Grifola frondosa*). If the pulp left after squeezing vegetables or fruits is used, it can be a foodstuff that is quite acceptable for vegetarians. Moreover, since such pulp left after squeezing, for example, juice is often dumped, it can be obtained inexpensively, which can lead to lower costs. Examples of vegetables include Japanese radish, burdock, and celery. Examples of fruits include apples and Japanese pears. However, the examples are not limited to those listed above.

Soy pulp, mushrooms, vegetables, and fruits containing a certain amount of moisture or in a dried state may be used. Concerning dried soy pulp, dried mushrooms, dried vegetables, and dried fruits, commercially available dried food materials can be purchased and used. However, such dried food materials can also be obtained, for example, by sun-drying or by freeze-drying. The dried materials have excellent shelf life, are easy to deal with, and are suitable for mass production.

In addition, in the manufacturing method of the present invention, only one material selected from a group consisting of soy pulp, mushrooms, vegetables and fruits may be used, or the mixture of two or more of these materials may also be used.

The eggs used in the present invention add a meat-like texture to the foodstuffs according to the present invention, give sufficient firmness to the food product, and can eliminate dryness. Examples of eggs include eggs of chickens, ducks, quails, or turkeys; provided, however, that the examples are not limited to those listed above. Instead of raw eggs, it is possible to use a foodstuff that can give the same texture as raw eggs give and can be mixed with soy pulp. For example, grated Chinese yams can be mixed in the materials instead of eggs. Using Chinese yams, it is possible to give sufficient firmness, and to eliminate dryness, and the resultant product can be eaten by people who suffer atopy reactions like allergies caused by eggs. Eggs and Chinese yams in the form of, for example, freeze-dried products and dried powder materials can be used.

As the konnyaku material used in the present invention, a konnyaku potato that is simmered and then mashed, or that is mashed and then simmered may be used, but konnyaku powder is more preferable. Konnyaku powder is easy to deal with, has excellent shelf life, and is suitable for mass production of processed foods.

In the manufacturing method of the present invention, it is desirable that at least one material selected from the group consisting of dried soy pulp, dried mushrooms, dried vegetables, and dried fruits be mixed with the konnyaku material in a weight ratio ranging from 33:67 to 83:17. Such weight ratio makes it possible to obtain processed food that easily absorbs flavors and is very cohesive, and that does not fall apart when simmered, baked, or fried, and that is thereby optimal as foodstuffs for cooking.

In the manufacturing method of the present invention, it is desirable that the raw eggs be mixed with the konnyaku material in a weight ratio ranging from 55:45 to 83:17. Such weight ratio makes it possible to obtain a more preferable foodstuff that has sufficient firmness and no dryness.

In the manufacturing method of the present invention, if Chinese yams are mixed instead of eggs, it is desirable that the Chinese yams be mixed with the konnyaku material in a weight ratio ranging from 72:28 to 83:17. Such weight ratio makes it possible to obtain a more preferable foodstuff that has sufficient firmness and no dryness as in the case when eggs are used. Grated Chinese yams may be replaced by grated aroids, grated lotus roots, or grated potatoes.

The above foodstuffs can be mixed by ordinary methods. For example, one method of mixing dried soy pulp, raw eggs, and konnyaku material is a method to evenly knead soy pulp with water to achieve 80% moisture content, add konnyaku material and raw eggs to the soy pulp, and then stir the mixture. Another mixing method is to dissolve the konnyaku material in warm water, and then either add dried soy pulp and raw eggs separately and stir the obtained mixture, or add a mixture of soy pulp and raw eggs and stir the obtained mixture.

An alkali solution is then added to the mixture obtained above to solidify and mold it. As for the alkali solution used to solidify the processed food of the present invention, a solution obtained by dissolving, for example, calcium hydroxide, sodium carbonate, sodium hydroxide, or calcium carbonate in warm water, can be used. The alkali solution has not only a solidifying effect but also has a germicidal effect, and thereby improves the keeping quality of foodstuffs. Moreover, it neutralizes nitric acid contained in the konnyaku potato. After being solidified, the mixture is simmered so that the remaining alkali content is removed in order to make the resultant product edible as a foodstuff.

The processed food of the present invention is characterized in that it is manufactured by the manufacturing method of the present invention. The processed food of this invention easily absorbs flavors, is very cohesive, does not fall apart when simmered, baked, or fried, and is thereby optimal as cooking foodstuffs. Moreover, since it is made of soy pulp and konnyaku material, it includes only food fiber, and thereby it is relatively low-calorie and effective for health or beauty and especially, highly effective as a diet food product. Since it has a meat-like texture, it can be grilled, broiled with soy sauce, sauted, or simmered, and it can be used in hamburgers or meat sauces instead of using minced meat. Therefore, the processed food of this invention is suitable for people who restrict meat in their diet. It can also cure the shortage of food fiber. Furthermore, if it is mixed with simmered vegetables, the onbatined product can be a well-balanced food product. It is also possible to adjust its flavor by adding seasonings such as oil, seaweed drink, or sugar to the degree that the seasonings would not affect the meat-like texture.

Embodiment 1

Embodiment 1 of the present invention and manufacturing steps thereby are now explained.

A kneaded form of soy pulp (prepared by evenly kneading 20 g to 200 g of dried soy pulp with water to achieve 80% moisture content), 40 g of konnyaku powder, and 50 g to 200 g of raw eggs are all put in 700 cc to 1400 cc of warm water and are evenly mixed. The resultant mixture is then solidified using an alkali solution, thereby obtaining processed food. As for the alkali solution, an aqueous solution prepared by dissolving 2.5 g of calcium hydroxide in 100 cc of warm water is used. The appropriate temperature of the warm water should be from 30° C. to 80° C. If the soy pulp that has been just squeezed (80% moisture content) is used, 100 g to 1000 g of such soy pulp should be used. In order to evenly mix the soy pulp, the konnyaku powder, and the raw eggs in warm water, there is a method of first dissolving konnyaku powder in warm water, and then either adding the soy pulp and the raw eggs separately or adding a mixture of the soy pulp and the raw eggs to the solution, and finally stirring the obtained solution.

Embodiment 2

Embodiment 2 of the present invention and manufacturing steps thereof are now explained.

A kneaded form of soy pulp (prepared by evenly kneading 20 g to 200 g of dried soy pulp with water to achieve 80% moisture content), 40 g of konnyaku powder, and 100 g to 200 g of grated Chinese yams are all put in 700 cc to 1400 cc of warm water and are evenly mixed. The resultant mixture is then solidified using an alkali solution, and thereby obtaining processed food.

Embodiment 3

Embodiment 3 of the present invention and manufacturing steps thereof are now explained.

A kneaded form of soy pulp (prepared by evenly kneading 20 g to 200 g of mushrooms with water to achieve 80% moisture content), 40 g of konnyaku material, and 50 g to 200 g of eggs are all put in 700 cc to 1400 cc of warm water and are evenly mixed. The resultant mixture is then solidified using an alkali solution, and thereby obtaining processed food.

Embodiment 4

Embodiment 4 of the present invention and manufacturing steps thereof are now explained.

A kneaded form of soy pulp (prepared by evenly kneading 20 g to 200 g of pulp left after squeezing vegetables or fruits with water to achieve 80% moisture content), 40 g of konnyaku material, and 50 g to 200 g of raw eggs are all put in 700 cc to 1400 cc of warm water and are evenly mixed. The resultant mixture is then solidified using an alkali solution, and thereby obtaining processed food. The moisture content of the pulp left after merely squeezing vegetables or fruits is approximately 80%.

EXAMPLE 1

According to each weight ratio shown in the upper two rows of Tables 1 and 2, dried soy pulp and konnyaku powder were mixed. The mixture was solidified by adding an alkali solution, and then the flavor absorption degree and cohesiveness of the obtained processed food were examined.

Tables 1 and 2 show the results. In these tables, the following symbols indicate the following results:

X: Bad flavor absorption Δ: Somewhat satisfactory flavor absorption ○: Good flavor absorption X: Bad cohesiveness Δ: Somewhat satisfactory cohesiveness ○: Good cohesiveness The term "cohesiveness" means the force of maintaining an agglomerated state.

TABLE 1

| Weight ratio of soy pulp | 10 | 20 | 30 | 31 | 32 | 33 | 40 | 50 | 60 | 70 | 80 | 90 |
|---|---|---|---|---|---|---|---|---|---|---|---|---|
| Weight ratio of Konnyaku | 90 | 80 | 70 | 69 | 68 | 67 | 60 | 50 | 40 | 30 | 20 | 10 |
| Flavor absorption degree | X | X | Δ | Δ | Δ | ○ | ○ | ○ | ○ | ○ | ○ | ○ |

TABLE 2

| Weight ratio of soy pulp | 96 | 95 | 90 | 89 | 88 | 85 | 84 | 83 | 80 | 70 | 33 |
|---|---|---|---|---|---|---|---|---|---|---|---|
| Weight ratio of Konnyaku | 4 | 5 | 10 | 11 | 12 | 15 | 16 | 17 | 20 | 30 | 67 |
| Cohesiveness | X | Δ | Δ | Δ | Δ | Δ | Δ | ○ | ○ | ○ | ○ |

According to Tables 1 and 2, it has been found that the optimal condition for the flavor absorption degree and cohesiveness of the processed food of the present invention is to have the weight ratio of soy pulp to konnyaku powder ranging between 33:67 and 83:17.

EXAMPLE 2

According to each weight ratio shown in the upper two rows of Tables 3 and 4, dried soy pulp, raw eggs, and konnyaku powder were mixed, and the mixture was solidified using an alkali solution. Then the firmness and dryness of the obtained processed food were examined. Tables 3 and 4 show the results. In these tables, the following symbols indicate the following results:

| X: Not firm | Δ: A little firm | ○: Sufficiently firm |
| X: Terribly dry | Δ: A little dry | ○: Not dry |

TABLE 3

| Weight ratio of egg | 60 | 70 | 80 | 81 | 82 | 83 | 84 | 85 | 86 | 87 | 90 |
|---|---|---|---|---|---|---|---|---|---|---|---|
| Weight ratio of Konnyaku | 40 | 30 | 20 | 19 | 18 | 17 | 16 | 15 | 14 | 13 | 10 |
| Firmness | ○ | ○ | ○ | ○ | ○ | ○ | Δ | Δ | Δ | X | X |

TABLE 4

| Weight ratio of egg | 45 | 46 | 47 | 48 | 49 | 50 | 51 | 52 | 53 | 54 | 55 | 56 | 60 | 70 |
|---|---|---|---|---|---|---|---|---|---|---|---|---|---|---|
| Weight ratio of Konnyaku | 55 | 54 | 53 | 52 | 51 | 50 | 49 | 48 | 47 | 46 | 45 | 44 | 40 | 30 |
| Dryness | X | X | X | X | X | Δ | Δ | Δ | Δ | Δ | ○ | ○ | ○ | ○ |

When the amount of the eggs was too much, the obtained product was sloppy. However, when the amount of the eggs was too little, the dryness increased.

According to Tables 3 and 4, the optimal condition for moderating the dryness of the soy pulp and smoothing its texture is to have the weight ratio of eggs to konnyaku ranging between 55:45 and 83:17.

EXAMPLE 3

According to each weight ratio shown in the upper two rows of Tables 5 and 6, Chinese yams and konnyaku powder were mixed, and the mixture was solidified using an alkali solution. Then the firmness and dryness of the obtained processed food were measured. Tables 5 and 6 show the results. In these tables, the following symbols indicate the same results as in Example 2.

TABLE 5

| Weight ratio of Chinese yam | 79 | 80 | 81 | 82 | 83 | 84 | 85 | 86 | 87 | 90 |
|---|---|---|---|---|---|---|---|---|---|---|
| Weight ratio of Konnyaku | 21 | 20 | 19 | 18 | 17 | 16 | 15 | 14 | 13 | 10 |
| Firmness | ○ | ○ | ○ | ○ | ○ | Δ | Δ | Δ | X | X |

TABLE 6

| Weight ratio of Chinese yam | 63 | 64 | 65 | 66 | 67 | 68 | 69 | 70 | 71 | 72 | 73 | 74 | 75 |
|---|---|---|---|---|---|---|---|---|---|---|---|---|---|
| Weight ratio of Konnyaku | 37 | 36 | 35 | 34 | 33 | 32 | 31 | 30 | 29 | 28 | 27 | 26 | 25 |
| Dryness | X | X | X | X | X | Δ | Δ | Δ | Δ | ○ | ○ | ○ | ○ |

When the amount of the Chinese yams was too much, the obtained product was sloppy. However, when the amount of the Chinese yams was too little, the dryness increased.

According to Tables 5 and 6, the optimal condition for solving the firmness and the dryness problems of the processed food of the present invention is to have the weight ratio of Chinese yams to konnyaku ranging between 72:28 and 83:17.

According to the present invention, it is possible to provide processed food that easily absorbs flavors, is very cohesive, does not fall apart when simmered, or fried, and is thereby optimal as foodstuffs for cooking.

I claim:

1. A processed food, solidified with an alkali solution, comprising konnyaku powder, raw egg and dried soy pulp, wherein said soy pulp is present in said processed food at greater than 20% by dry weight, based on the total dry weight of said soy pulp and said konnyaku material, wherein the weight ratio of said dried soy pulp to said konnyaku powder (dried soy pulp: konnyaku powder) ranges between 33:67 to 83:17.

2. A processed food solidified or solidifiable with an alkali solution, said processed food comprising konnyaku material, egg and dried soy pulp, wherein the weight ratio of dried soy pulp to said konnyaku material is from 33:67 to 83:17.

3. The processed food according to claim 2, wherein said egg is raw egg, and said konnyaku material is konnyaku powder.

4. The processed food according to claim 1, further comprising at least one substance selected from the group consisting of mushrooms, vegetables, and fruits.

5. The processed food according to claim 2, further comprising at least one substance selected from the group consisting of mushrooms, vegetables, and fruits.

6. The processed food according to claim 1, wherein said egg comprises egg from a chicken, duck, quail or turkey.

7. The processed food according to claim 1, wherein the alkali solution comprises an aqueous solution of a substance selected from the group consisting of calcium hydroxide, sodium carbonate, sodium hydroxide and calcium carbonate.

* * * * *